United States Patent Office 3,340,250
Patented Sept. 5, 1967

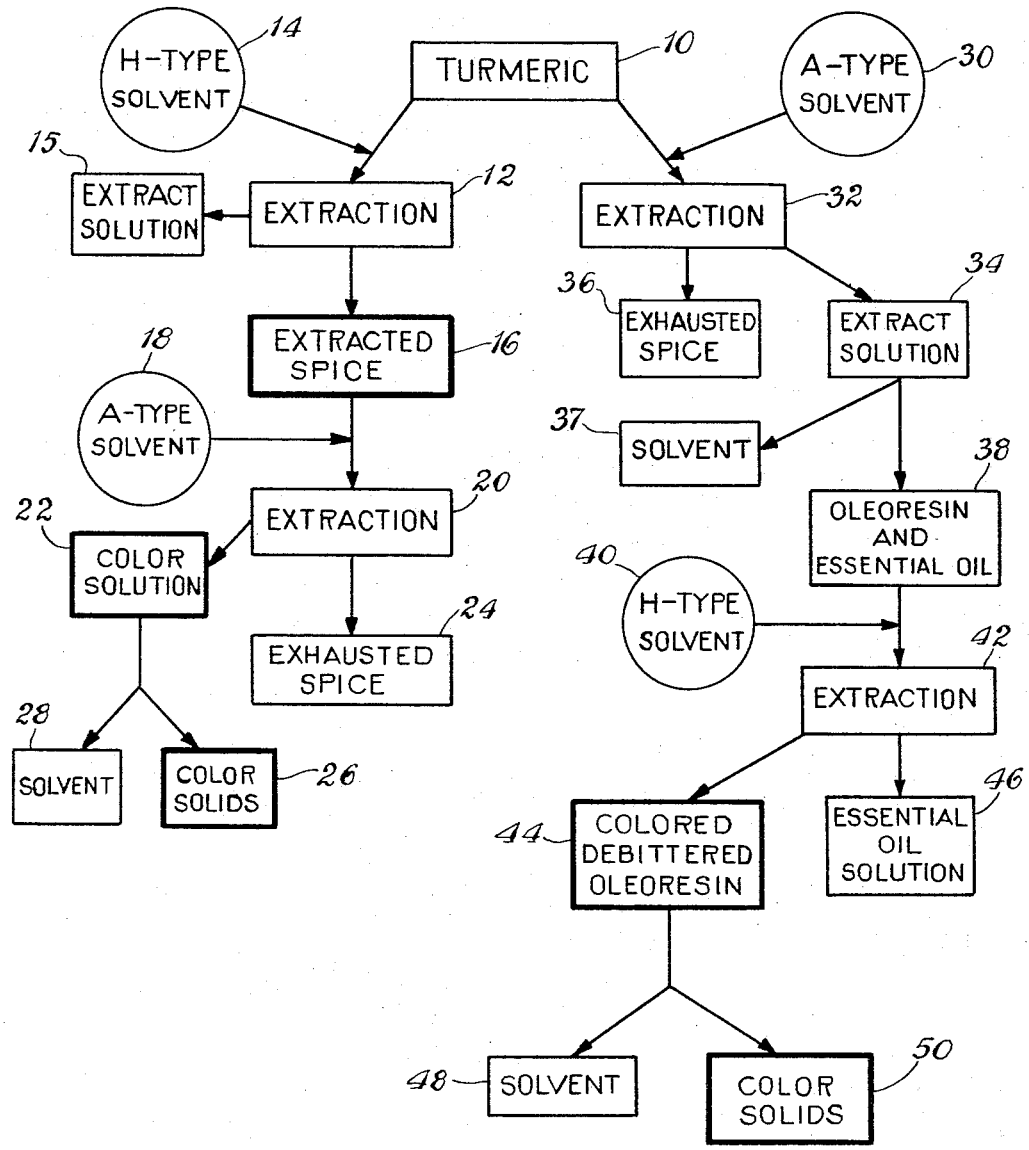

3,340,250
EXTRACTING VALUES FROM TURMERIC
Louis Sair, Evergreen Park, and Leo Klee, Chicago, Ill., assignors to The Griffith Laboratories, Inc., Chicago, Ill., a corporation of Illinois
Filed Sept. 18, 1963, Ser. No. 309,762
5 Claims. (Cl. 260—236.5)

The present invention relates to extracting desirable and undesirable content from natural turmeric and from certain solvent-extracts of turmeric. In particular, it relates to producing a debittered turmeric color with or without the fibrous part of natural turmeric.

Turmeric is a spice used in the food industry, for example, in connection with pickles and poultry products such as seasonings. It is used for its high color value, and less frequently, for its flavor. Natural turmeric has a bitter principal which is removed in removing volatile oil. It also contains an oleoresin of which the curcumin content is the principal color factor.

Turmeric has many uses as a ground spice. In some uses, it is desirable, especially in the pickle industry, to extract the oleoresin, which contains the color, from the ground spice and use the oleoresin for color, especially in a solubilized form in a brine for pickles.

In preparing the oleoresin extract, the color value has been concentrated by extracting ground turmeric with certain solvents which dissolve the oleoresin, and hence, the color value, and which also extract the essential oil. Such solvents are exemplified by methyl alcohol, isopropyl alcohol, acetone, ethylene dichloride and trichlorethylene, which are herein termed A-type solvents. These solvents have relatively low boiling points and on distilling the solvent from the extract, the bulk of the essential oil with its bitter principal remains with the oleoresin.

The present invention aims to provide the spice of turmeric, or the coloring of oleoresin of turmeric, substantially free from the bitter principal of turmeric, and without loss of color.

We have discovered that there are solvents which are preferentially selective of the volatile oil with the bitter principal, and simultaneously poorly selective of the color bodies. Solvents such as the aliphatic hydrocarbons or mixtures, represented by petroleum ether and preferably hexane, may be so used. These are designated H-type solvents, and as volatile-oil selectors, to distinguish them from the A-type solvents which extract both oleoresin with its color bodies, and the volatile oil with its bitter principal.

The following Table I illustrates the selective action of such hydrocarbons as contrasted to the action of an aromatic hydrocarbon and a monohydric alcohol.

According to the present invention natural turmeric is extracted with hexane at temperatures varying from room temperature to the reflux temperature, and the color value of the hexane-free extracted turmeric is little changed from that of the natural turmeric, the bitter principal having been removed. The selective action of the H-type volatile-oil selectors can be used to debitter the prior art oleoresin extracts of turmeric which are produced by extracting with the A-type solvents.

The process may be carried out in several ways best shown graphically in the accompanying drawing.

Numeral 10 represents natural turmeric, preferably processed in ground form. It is extracted at 12 with an H-type solvent 14, such as hexane, producing an extract 15 containing the essential oil and the bitter principal. The extracted spice 16 is thus a useful debittered ground turmeric and it is one end product of the invention as indicated by the heavier outline of the block.

However, the end product 16 may be further processed to concentrate the color value. This is done by use of an A-type solvent 18, such as acetone. The extraction designated 20 produces a debittered oleoresin solution 22 containing the color bodies, which solution may be used as an end product. The exhausted spice is designated 24.

The solvent in end product 22 may be distilled off to provide the solvent-free oleoresin 26 with the color bodies as an end product, and to provide the recovered solvent 28.

However, the invention is not limited to the said sequence. The turmeric 10 may be processed in a well-known manner using the A-type solvent 30 for extraction 32, producing a solution 34 of colored oleoresin and volatile oil, thus containing the bitter principal. The exhausted spice is designated 36. Prior art solvent-free turmeric oleoresins are thus produced by distilling off the A-type solvent yielding solvent 37 and solids 38 which contain both oleoresin and essential oil including the bitter principal. The relatively low boiling points of A-type solvents effect retention of essential oil with the oleoresin. Then, the H-type solvent is used to remove the essential oil with its bitter principal and to leave oleoresin.

The substance 38 containing the bitter principal is extracted with the H-type solvent 40 selectively to extract at 42 the volatile oil and leave oleoresin with its curcumin undissolved, thus yielding a solvent-wet colored debittered oleoresin as end product 44 and an essential oil solution 46. The solvent in the oleoresin 44 may be volatilized away providing solvent 48 and an end product 50 which is the debittered color concentrate of curcumin.

The following examples not only illustrate the invention, but establish the selectivity upon which it is based.

| Solvent Used | Temperature of Extraction, deg. F. | Color Value of Trumeric [1] | | Percent of Oleoresin Extracted |
|---|---|---|---|---|
| | | Before Extraction | After Extraction | |
| Isopropyl alcohol | 140–150 | 48 | 7 | 11.1 |
| Benzene | 130–140 | 48 | 16 | 6.8 |
| Petroleum Ether (B.P. 30°–60° C.) | 100–110 | 48 | 49 | 3.5 |
| n-Heptane | 160–170 | 48 | 49 | 1.7 |
| Hexane (Commercial) [2] | 150–160 | 41 | 41 | 3.1 |
| Do. [2] | 100–110 | 41 | 41 | 3.0 |
| Do. [2] | 70–80 | 41 | 41 | 2.4 |

[1] Color value is determined as follows: 0.25 gram of trumeric is placed in a 100 ml. measure with 50 ml. of acetone, and boiled gently on a steam bath for 30 minutes. The suspension is then brought to 100 ml. by adding acetone, and filtered. A 1 ml. aliquot portion is diluted to 25 ml. with acetone. The color value is then read on the scale of a 425B filter in a Fisher electrophotometer.

[2] Commercial hexane is a mixture of hydrocarbons largely $C_6H_{14}$.

Example 1

25 gms. of ground turmeric having a color value of 41 are mixed and agitated for two hours at room temperature of 70° to 80° F., with 100 ml. of hexane. After filtering 100 ml. of hexane was used to repeat the extraction. After the second filtration the air-dried residue had a color value of 41. The solvent was evaporated to dryness leaving a residue of bitter taste. The solids of the extract were 2.4% of the original turmeric.

Example 2

Example 1 was repeated at 100° F. to 110° F. The color value of the residue remained at 41. The solids of the hexane extract were 3% of the original turmeric and bitter.

Example 3

Example 1 was repeated at the reflux temperature of 150° to 160° F. The residue remained at a color value of 41. The solids extracted were 3.1% of the original turmeric.

Although the above examples represent a static extraction, it is to be understood that solvent extraction may be carried out in numerous well-known ways, such as countercurrent flow of solvent and material, the preferred method being percolation of solvent through a bed of the ground turmeric.

It is also to be understood that the end products of extracted substance may be the solvent solution of the extracts, preferably concentrated, or the recovered solids of the solvent extracts.

The invention, therefore, provides a debittered turmeric comprising that portion of the natural turmeric which is insoluble in a volatile solvent of the class including hexane which is an essential oil selector. Using the prior art oleoresin extract of turmeric which is soluble in a solvent of the class including acetone, it provides a color extract free of that portion of natural turmeric which is insoluble in a solvent of the class including hexane, as expressed in the appended claims.

We claim:

1. The method of forming a debittered turmeric color from turmeric material which contains oleoresin and essential oil thereof which comprises subjecting said turmeric material to the extracting action of an aliphatic hydrocarbon solvent having the solvent characteristics of solvent selected from the group consisting of petroleum ether, benzene, heptane, hexane and mixtures thereof in respect to preferential selectivity for the essential oil content and the simultaneous poor selectivity for the colored oleoresin content, and separating the oil-containing solvent from the colored residue.

2. The method of claim 1 in which the solvent is hexane.

3. The method of claim 1 in which the turmeric material is ground natural turmeric.

4. The method of concentrating the coloring matter of natural turmeric which comprises subjecting the turmeric to the extracting action of an aliphatic hydrocarbon solvent having the solvent characteristics of solvent selected from the group consisting of petroleum ether, benzene, heptane, hexane and mixtures thereof in respect to preferential selectivity for the essential oil content and the simultaneous poor selectivity for the colored oleoresin content, separating the extract from the extracted turmeric, and then subjecting said extracted turmeric to the extracting action of a volatile solvent having the solvent characteristics of solvent selected from the group consisting of methyl alcohol, isopropyl alcohol, acetone, ethylene dichloride and trichlorethylene in selectivity for the oleoresin content, thereby forming a solution of coloring matter in a volatile solvent.

5. The method of concentrating the coloring matter of natural turmeric which comprises subjecting the turmeric to the extracting action of an aliphatic hydrocarbon solvent having the solvent characteristics of solvent selected from the group consisting of petroleum ether, benzene, heptane, hexane and mixtures thereof in selectivity for the essential oil content of the natural turmeric and in the simultaneous poor selectivity for the colored oleoresin content, separating the extract from the extracted turmeric, then subjecting said extracted turmeric to the extracting action of a volatile solvent having the solvent characteristics of solvent selected from the group consisting of methyl alcohol, isopropyl alcohol, acetone, ethylene dichloride and trichlorethylene in selectivity for the oleoresin content, thereby forming a solution of coloring matter in a volatile solvent, and removing the solvent from the coloring matter.

References Cited

UNITED STATES PATENTS 2,571,948    10/1951    Sair et al. _____ 99—140
2,925,344    2/1960    Peat _____ 99—140

FOREIGN PATENTS 658,958    4/1938    Germany.

OTHER REFERENCES

Guenther: Essential Oils, Van Nostrand, New York, N.Y. (1952), page 120.

Karrer: Organic Chemistry, Elsevier, New York, N.Y. (1938), page 478.

Mitra et al.: Chemical Abstracts, vol. 52 (1958), pages 1504–5.

WALTER A. MODANCE, *Primary Examiner.*

J. A. PATTEN, *Assistant Examiner.*